United States Patent [19]

Wine

[11] 4,406,002
[45] Sep. 20, 1983

[54] SERVO SYSTEM FOR A VIDEODISC PLAYER CARRIAGE ASSEMBLY

[75] Inventor: Charles M. Wine, Princeton, N.J.

[73] Assignee: RCA Corporation, New York, N.Y.

[21] Appl. No.: 304,349

[22] Filed: Sep. 22, 1981

[51] Int. Cl.³ .................. G11B 21/04; G11B 17/00
[52] U.S. Cl. .................................. 369/220; 369/58
[58] Field of Search ............... 369/220, 58, 219, 215, 369/222

[56] References Cited

U.S. PATENT DOCUMENTS

| | | | |
|---|---|---|---|
| 4,198,871 | 4/1980 | Dunn et al. | 74/37 |
| 4,249,746 | 2/1981 | Mimasu | 369/221 |
| 4,280,023 | 7/1981 | Christopher | 369/43 |
| 4,313,189 | 1/1982 | McGuffin | 369/220 |
| 4,327,434 | 4/1982 | Christopher | 369/220 |
| 4,334,276 | 6/1982 | Turnbull | 369/58 |
| 4,340,949 | 7/1982 | Kelleher | 369/33 |

*Primary Examiner*—Steven L. Stephan
*Attorney, Agent, or Firm*—E. M. Whitacre; Rasmussen P. J.; E. P. Herrmann

[57] ABSTRACT

A servo system for a VideoDisc player stylus carrying carriage assembly is described which precludes the servo system entering a hunt mode due to the signal pickup stylus tracking an eccentric signal track. The player comprises a carriage for housing a track following signal pickup stylus compliantly mounted therein. A position detector generates an analog signal proportional to the stylus position relative to a relaxed or centered position. The position signal is converted to a bilevel signal (i.e. relatively positive and relatively negative levels), the two levels corresponding to the stylus being to the right or left of the centered position respectively. The bilevel signal is sampled at regular intervals, e.g. eight, per disc revolution. Counter circuitry counts the number of samples per disc revolution which are at the relatively positive level. The resulting number is examined to determine whether it is greater or lesser than one half the total number of samples per revolution and forward or backward control signals are generated respectively. The control signals are applied to a stepper motor coupled to the carriage for translating the carriage and thereby the stylus radially across the disc.

10 Claims, 4 Drawing Figures

SERVO SYSTEM FOR A VIDEODISC PLAYER CARRIAGE ASSEMBLY

BACKGROUND OF THE INVENTION

This invention relates to VideoDisc player apparatus and in particular to the servo electronics for a stylus carrying carriage mechanism.

Certain types of VideoDisc systems utilize disc records wherein information is prerecorded by means of geometric variations in tracks or grooves proximate the surface of the disc. The information is reproduced by means of a signal pickup stylus which engages the track or groove and detects the geometric variations representative of the prerecorded signal. In the capacitance type systems the stylus-record interaction operates to form a time varying capacitance as the geometric variations in a particular track are moved past the stylus by the rotation of the disc, which time varying capacitance forms part of a tuned circuit to amplitude modulate a carrier frequency. The amplitude modulation is thereafter detected and converted to video and audio signals suitable for reproduction on standard receivers. In the pressure sensitive systems, geometric variations in the groove apply a time varying force to the stylus which is mechanically coupled to a pressure sensitive transducer for conversion to electrical signals.

VideoDisc systems of this type typically employ disc records having track or groove densities of 6,000 to 10,000 per inch. As a result of such high groove densities, it is difficult to reliably translate the stylus radially across the disc in accordance with normal play. Therefore the signal pickup stylus is mounted in a carriage assembly driven by motive means for translating the stylus radially across the disc generally synchronously with the rotation of the disc. Because the tracks tend to be slightly eccentric the stylus is mounted within the carriage for limited radial movement of the stylus with respect to the carriage. Such relative movement mechanically biases the stylus mounting arm from its home position and undesirably affects a stylus deflection transducer which provides for stop motion and other special effects. In order to compensate for this condition, the relative stylus position with respect to the carriage assembly is monitored, and the carriage translation is controlled to maintain the stylus mounting arm in a generally unbiased condition with the stylus centered over the track.

One such stylus position monitoring system is disclosed in U.S. Pat. No. 4,280,023, filed July 9, 1979 entitled, "Stylus Position Sensing Apparatus for VideoDisc Player" assigned to the assignee of the present invention. That particular invention senses the stylus position by (a) establishing a capacitance between a first electrode fixed to the carriage and a second electrode mounted in fixed relation to the stylus, (b) measuring the change in capacitance caused by changes in the relative proximity of the first and second electrodes to each other by (c) detecting the relative amplitude of an oscillatory signal coupled from the first to the second electrode, and (d) generating a control signal proportional to such coupled signal. The control signal regulates a DC motor which is mechanically coupled to drive the carriage commensurate with the tracking speed of the stylus.

In order to reduce cost and increase reliability it is desirable to replace the DC carriage drive motor with a stepper motor. However, in the presence of track eccentricity it was found that a stepper motor system tends to enter a hunt mode making steps forward and backward in a single disc revolution. This condition is exacerbated if there is a substantial degree of backlash in the mechanical motor-carriage coupling. Under these conditions the carriage assembly vibrates fore and aft objectionably.

BRIEF SUMMARY OF THE INVENTION

The present inventor realized that the stylus displacement relative to the servo sensor, due to track eccentricity, conforms to a generally sinusoidal movement. If the stylus is properly centered in the carriage it will make approximately equidistant excursions on either side of the center position per revolution (assuming the eccentricity is appreciably greater than the track pitch). The present invention detects whether or not the stylus position is following a generally sinusoidal path about the centered position and applies corrective steps in accordance therewith.

The present invention comprises a VideoDisc player including a track following stylus mounted in a carriage assembly. The carriage assembly is driven by a stepper motor to traverse the stylus radially across the disc record. The stepper motor successively advances the carriage in quantized steps responsive to a predetermined number of disc revolutions. A sensor system determines the relative position of the pickup stylus to the carriage assembly. The position signal is applied to a comparator which generates a bilevel signal indicative of which side of the center position the stylus presently resides. The bilevel signal is regularly sampled at prescribed intervals each disc revolution. The number of occurences i.e. samples that per revolution the stylus is to the right (or left) of center is counted and if that number is greater (lesser) that a predetermined number the carriage is correctively stepped forward (backward). The stepper motor does not respond to instantaneous values of the position control signal but rather to a derivative signal which is indicative that, on average, the stylus position is off-center for a particular groove convolution.

DETAILED DESCRIPTION OF THE INVENTION

Figure 1:
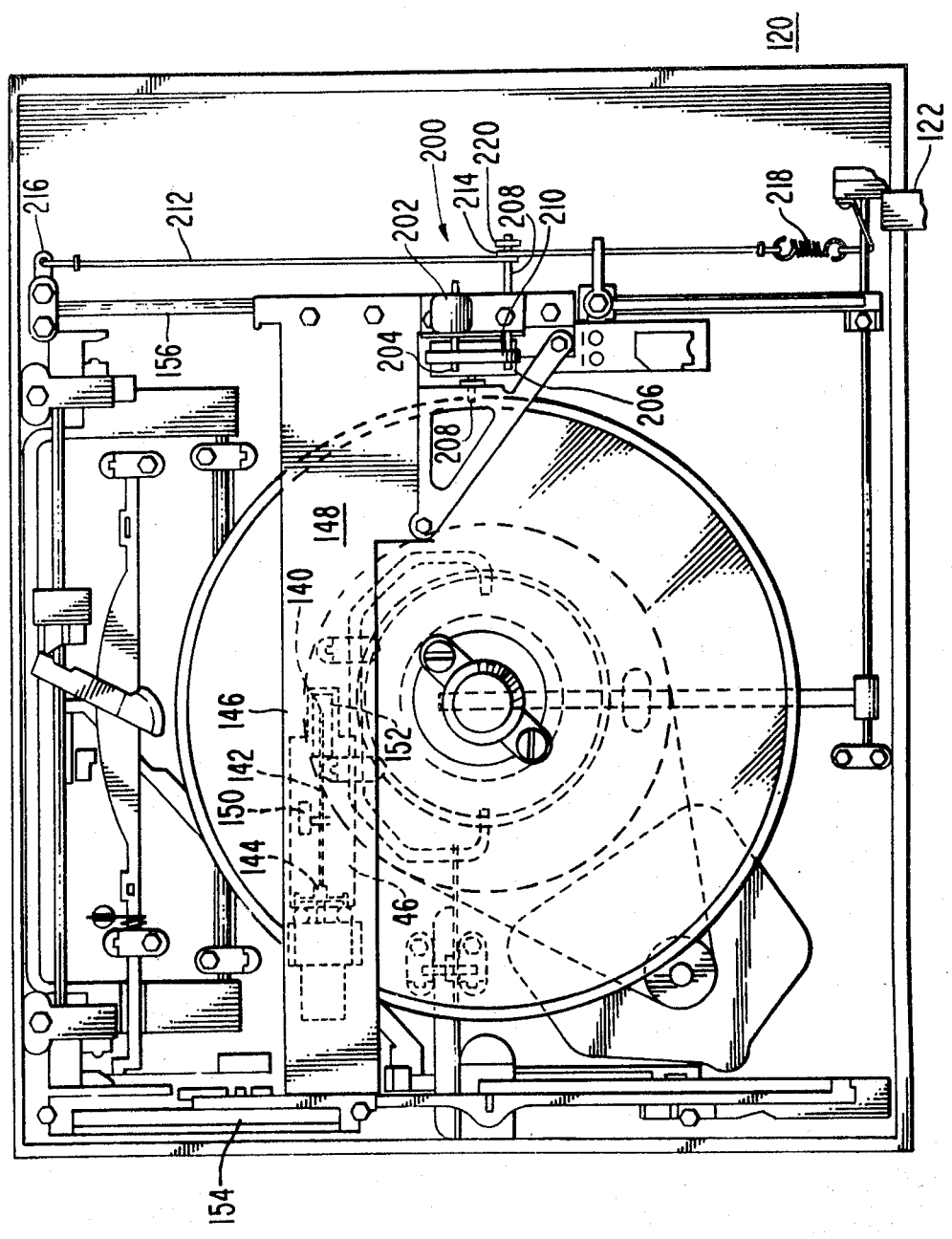
FIG. 1 represents a plan view of a VideoDisc player showing details of the carriage drive system.

Referring to FIG. 1 a VideoDisc player is shown including the signal pickup stylus carriage assembly 148 and its drive mechanism 200. The pickup stylus 140 is disposed at one end of a stylus arm 142, the other end of which is suspended in the cartridge 46 by means of a flexible rubber coupler 144. The cartridge 46 is placed in a compartment 146 provided in the stylus arm carriage 148. A stylus arm lifter 150 is mounted in the carriage 148 to selectively lower the pickup stylus 140 through an opening 152 provided in the bottom wall of the carriage to effect record engagement. During playback, the carriage drive mechanism 200, drives the carriage 148 on guide ways 154 and 156 from a starting position at the back of the player toward the front of the player in synchronism with the radially inward motion of the groove-guided pickup stylus 140.

The carriage drive mechanism 200 includes a selectively-operated stepper motor 202 mounted on the carriage 148. The motor output shaft 204 drives a pulley 206, rotatably mounted on a shaft 208, via a belt 210. A cable 212, having a portion 214 wrapped around the pulley shaft 208, has one end secured to a pin 216 fixedly mounted in the player. The other end of the cable 212 is attached to the function lever 122. A coil spring 218 is interposed between the two ends of the cable 212 to provide tension therein. A flange 220 is disposed on the pulley shaft 208 to retain the cable 212 thereon. When the function lever 122 is moved from the PLAY position to the LOAD/UNLOAD position, the tension in the cable 212, and thereby the wrap tension around the output shaft 208, is reduced to a point where the carriage 148 can move independently of the drive motor 202 and the pulley 206. The motion of the function lever 122 from the LOAD/UNLOAD position to the PLAY position increases the tension in the cable 212 to a level where the motor 202 drives the carriage 148 upon actuation. The rotational speed of the motor 202 and the dimensions of the various parts are such that the rate of advancement of the carriage 148 substantially corresponds to the radial motion of the groove-guided stylus 140.

Figure 2:
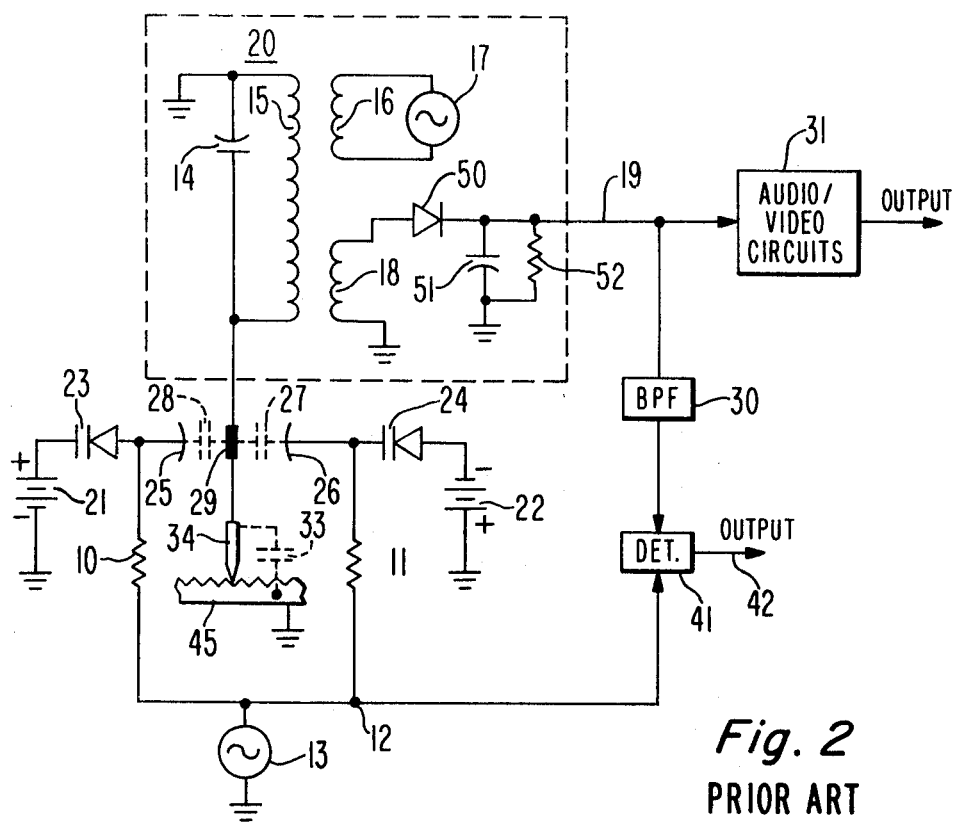
FIG. 2 is a schematic diagram of a stylus position sensing system.

Resident in the carriage 148 is a sensor system for detecting the position of the stylus in the carriage relative to a rest or mechanically unbiased position. The FIG. 2 arrangement is an existing application of a balanced sensor system employing varactor diodes as voltage variable impedances in a capacitive pickup type of VideoDisc system (application Ser. No. 116,249, filed Jan. 28, 1980 and assigned to the same assignee as the present inventor). In FIG. 2, the circuitry 20 circumscribed by the broken line represents a particular signal pickup circuit which cooperates with the stylus-record capacitance 33 to retrieve the prerecorded signal from record disc 45. The capacitor 33 is the effective capacitance formed between the stylus 34 and the record disc and varies in accordance with the geometric pattern in the disc groove moving past the stylus. Capacitor 33 is effectively in parallel connection with capacitor 14 and inductor 15 to form a parallel resonant or tank circuit. A coil 16 driven by an oscillatory potential source 17, e.g., a sinusoid of 915 MHz, inductively couples a signal to the tank circuit at a frequency slightly greater or slightly lesser than the nominal resonance frequency of the tank circuit. More precisely, the signal from source 17 intercepts the amplitude-frequency characteristic of the tank circuit at one-half its peak value. Changes in the capacitance value of capacitor 33 due to the recorded signal, alters the resonant frequency of the tank circuit causing the oscillatory signal coupled thereto to be amplitude modulated in accordance with the prerecorded signal. The amplitude modulated oscillatory signal is picked off the tank circuit by coil 18 and applied to the detector circuit comprising diode 50 and the resistor-capacitor combination 52, 51 respectively, which circuit effectively removes the oscillatory signal generated by the source 17 and supplies a signal representative of the prerecorded signal in the record disc to connection 19. This signal is processed by the audio and/or video circuits 31 for transmission to a standard receiver.

Onto the foregoing system a balanced stylus position sensor is effectuated using electrodes 25, 26, and 29 to form position-sensitive capacitances 27 and 28. Electrodes 25 and 26 are fixedly mounted either directly to the carriage 148 or to the cartridge 46. Electrode 29 is secured to the stylus arm 142 and moves therewith. As the stylus moves relative to the carriage, electrode 29 moves relative to electrodes 25 and 26 causing a change in the effective capacitance 28 between electrodes 25 and 29 and in the effective capacitance 27 between electrodes 26 and 29. A first varactor diode 23 serially connects capacitance 28 to reference potential 21 and a second varactor diode 24 serially connects capacitance 27 to reference potential 22. The serial connection of capacitor 28 and the effective capacitance of varactor diode 23, the serial connection of capacitor 27 and the effective capacitance of varactor diode 24 and the capacitance 33 are all effectively in parallel connection with capacitor 14 and may operate to change the resonant frequency of the tank circuit.

An oscillatory signal from source 13, e.g., a 262 KHz sinusoid, applies a time varying potential via resistors 10 and 11 respectively to the anode of varactor diode 23 and to the cathode of varactor diode 24, which time varying signal causes a modulation of the effective capacitance values of the varactors 23 and 24. The capacitance of varactor 23 increases (decreases) as the capacitance of varactor 24 decreases (increases). The total capacitance contributed by the varactor diodes across the tank circuit coil 15 remains constant for the condition that capacitances 27 and 28 are equal and the varactors are similar and have a linear capacitance-voltage relationship. As long as the capacitance of the position sensing elements remains constant, there is zero signal contribution from the oscillator 13 at output 19 of detector 50 and therefore a null may be realized.

A translation of the stylus and therefore the center electrode 29 will cause an increase (decrease) in capacitance 27 and a concomitant decrease (increase) in capacitance 28. Consider capacitance 27 increased by a rightward translation of the stylus. The capacitance 27 increases and the total capacitance exhibited by all the capacitors across the tank circuit is larger in time synchronism with the negative half cycles of the signal from source 13. Conversely, for leftward translation of the stylus the total effective capacitance is greater in time synchronism with the positive half cycles of the signal from source 13. These capacitance modulations effect an amplitude modulation of the signal applied to the tank circuit from source 17 in a similar fashion to the record disc induced modulation. The amount of capacitance modulation and thereby the amplitude modulation of the carrier signal is indicative of the extent of stylus translation and the phase of the ultimate signal is indicative of the direction of translation.

The prerecorded signals and the translation induced signals form a composite signal available at connection 19. The translation induced signal is extracted from the composite signal by bandpass filter 30 and detected by synchronous detector 41 to generate a position control signal at output terminal 42.

Referring to FIG. 3(a), circle A represents a concentric or properly aligned track on a disc record. A stylus following track A will maintain a substantially constant position relative to the carriage assembly. Circle B in FIG. 3(a) represents an eccentric track on a disc record. A signal pickup stylus following track B will undergo a substantially sinusoidal motion relative to the carriage assembly. This may be appreciated by considering lines A and B to the right of circles A and B in FIG. 3(a). Lines A and B are the circles A and B developed in a linear fashion. As such line A represents the centered or null position for a properly aligned stylus. The condition of eccentricity causes track B to follow a curve extending above and below i.e. right and left of the null position. If the position detector is designed with time constants to produce instantaneous position signals, such signals at output terminal 42 will have a time varying waveshape similar to the FIG. 3(a) curves.

FIG. 3(b) is a bilevel signal representation of curve B in FIG. 3(a) with curve A as a reference. The signal of 3(b) is at a first state, "0", whenever curve B is below curve A and a second state, "1", when curve B is above curve A i.e. the reference or null position. If the curve in 3(b) is sampled during the pulse periods of FIG. 3(c) the digital representation FIG. 3(d) of curve b is produced. In the Figure, eight samples are taken for 360 degrees of the track to produce a binary word of 00001111 for the particular convolution. It is noted that there are an equal number of "1s" and "0s".

Consider that the stylus supporting carriage moves ahead of the stylus or conversely the stylus jumps a track backward. The effect vis a vis FIG. 3(a) is to displace curve B downward (upward) with respect to the null or center position of curve A with the result of putting more of curve B above or below reference curve A, thereby altering the curve of 3(b) and the eight bit digital word so that there are unequal "1s" and "0s". It should be appreciated from the foregoing that where the digital word for 360 degrees of track length contains substantially an equal number of "1s" and "0s" the tracking stylus, on the average, is substantially residing in the centered or null position. On the other hand, where there is an appreciable disparity in the number of "1s" and "0s" the stylus is off center in a direction which may be determined simply by counting "1s" (or "0s".) The relative position of the stylus may be updated at the sampling rate by examining successively each eight bit word formed by the lastmost eight samples. Alternatively the position may be updated at the disc cyclic rate by examining each set of eight samples formed by successive exclusive groups of eight samples.

Figure 3:
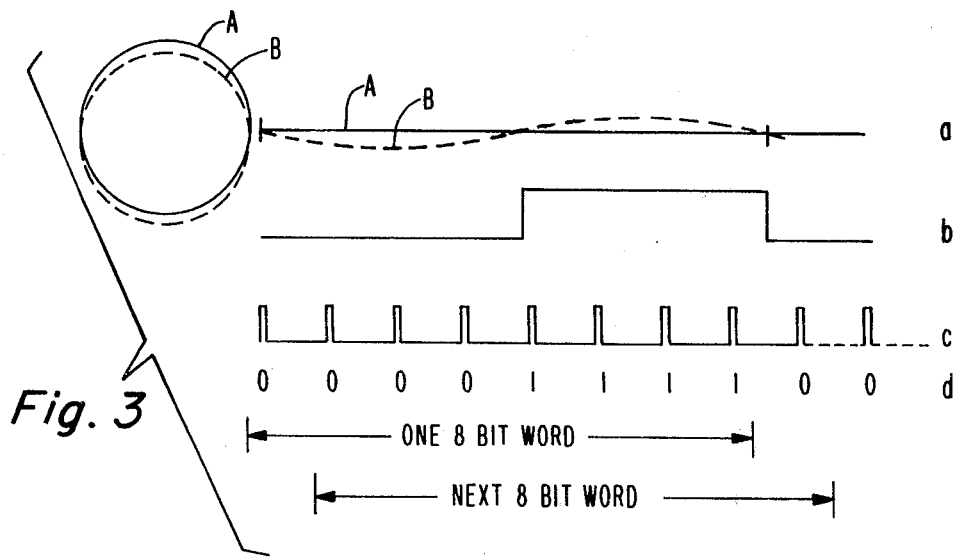
FIG. 3 is a graphic representation of record disc track eccentricity (a); bilevel representation of the eccentricity, (b); a pulse train representing sampling intervals, (c); and a digital representation of the eccentricity at each sampling period (d)
Figure 4:
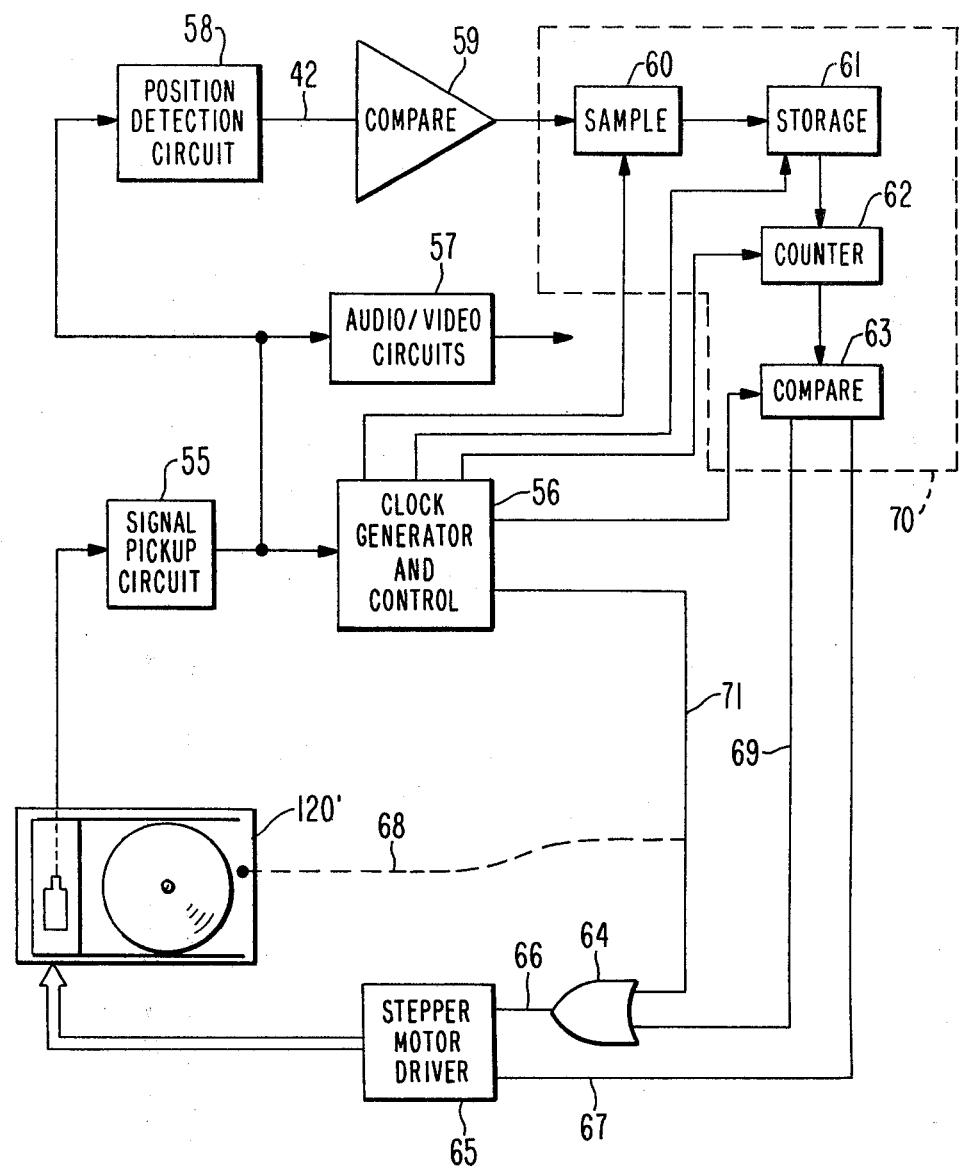
FIG. 4 is a partial block, partial schematic diagram of the carriage servo system embodying the present invention.

The FIG. 4 player includes circuitry to perform stylus position determination as per FIG. 3. A disc record player 120 includes a stylus carrying carriage driven by a stepper motor. A sensor system including circuit 58 detects the relative stylus-carriage position, producing a time varying analog position signal at connection 42. A comparator or threshold detector 59, compares the position signal to a reference level associated with the stylus null position and produces a bilevel signal, the state of which is dependent upon whether the stylus is to the right or left of null. The bilevel signal is sampled a prescribed number of times e.g. eight, per disc revolution, a number of the samples being stored in storage unit 61. Eight bit sequences of the stored samples are processed by counter 62 wherein the number of "1s" or "0s" in the sequence are counted. This number is analyzed in circuit 63, e.g. an arithmetic logic unit, to ascertain if the "1s" and "0s" are equal, almost equal, or grossly unequal. The circuit 63 produces a position correction signal proportional to the level of inequality.

For example, if eight samples are made per disc revolution and the number of "1s" is four, no correction signal is produced. If the number of "1s" is three or less, a one step forward control pulse is produced on connection 69. Alternatively, if the number of "1s" is five or greater, a one step backward correction signal is produced on connection 67. The function may be performed simply by subtracting the number counted from one half the total samples per 360 degrees of track length. If the result is zero no correction is necessary. If the result is positive or negative, a forward or backward correction signal is produced respectively.

Nominally the control signals for a stepper motor are pulses of a particular duration, each pulse inducing a guantized angular displacement of the motor shaft. When the stylus is far from its null position, it is desirable to rapidly correct for such displacement requiring a number of stepper control pulses. The number of control pulses produced should therefore be made to depend more directly on the actual number counted. For example, where eight samples are made per disc revolution, a count of three, four, or five may be assigned to generate no control pulses, a count of one, two, six, or seven assigned to generate one control pulse and counts of zero or eight assigned to generate two control pulses. Note that with readily available digital arithmetic circuits or microprocessors it is straight forward to determine the range of the particular count and produce the appropriate response.

In one hardware implementation, a ready-only-memory (ROM) may be employed to perform the circuit 63 function. Assume that the count i.e. the output of counter 62 is a binary number. This binary number is applied to the decoder inputs of the ROM. Each of the memory locations corresponding to the possible valid binary addresses (i.e. numbers), output by the counter would be programmed to produce the desired output signal. For example, memory locations corresponding to binary addresses 0011,0100,0101 (3, 4, and 5 in decimal) are programmed to contain a "00" signal representing a zero output or no stepper response. Memory location 0001, 0010, 0110, and 0111 (1, 2, 6, and 7 respectively in decimal) are programmed to contain a "01" signal designating one stepper pulse and memory locations 0000 and 1000 (0 and 8 in decimal) may be programmed with a "11" signal designating two stepper pulses. The two most significant bits of the counter output may be ORed together producing a signal for counts of 4 or greater to indicate when the stepper translation should be in the forward or backward direction.

Alternatively circuitry 63 may establish the ratio of "1s" to "0s" and produce control signals related to the ratio. For example, assume eight samples per revolution and that counter 62 has counted the "1s" in the last eight samples. The number of "0s" is 8-X and the ratio of "1": "0" is simply X/(8-X). If the ratio is "one" the stylus is centered, if greater/lesser than one the stylus is to the right/left of the center position. Forward and reverse control signals are produced whenever the ratio is a prescribed amount greater or lesser than one.

Multimode stylus positioncorrection signals are generated depending upon the extent of stylus dislocation. However, no correction signals are produced if the stylus cycles or oscillates equally about the null position regardless of the extent of the excursion. As a result track eccentricity does not initiate forward and aft servo hunting.

In the FIG. 4 system, signals for controlling circuits 60, 61, 62, and 63 are produced by a clock generator circuit 56. The clock generator is responsive to the recorded signal recovered from the disc. Considering the RCA Corporation CED VideoDiscs, eight fields of video information including vertical blanking and sync signals are recorded in each revolution or 360 degrees of signal track. Chrominance information is included in a buried subcarrier within the recorded signal. The buried subcarrier can be extracted and utilized as a master oscillator to generate clocking/control signals e.g. by dividing the subcarrier frequency. Alternatively the control signals may be derived from the horizontal or the vertical sync signals.

In normal operation the stepper motor advances the carriage across the record at a speed commensurate with normal stylus tracking. This function is performed by generating forward drive pulse once each disc revolution or n revolutions depending upon the number of tracks traversed per step of the motor. The forward drive pulse may be produced in circuit 56 by simply counting the vertical sync pulses and generating a drive pulse at connection 71 once each eight (or n times eight) syncpulse occurences. Alternatively disc revolutions may be detected directly by a transducer coupled to the turntable to produce a drive pulse on connection 68 once each revolution (or n revolutions). The drive pulses are applied to OR circuit 64 which transmits them to a forward control input terminal 66 of the stepper motor drive circuit 65. If the carriage fails to keep up with the signal pickup stylus, a forward correction signal is produced by circuit 63 at connection 69 which is applied to the forward control input terminal of motor drive circuit 65 via OR circuit 64 to induce an additional forward carriage movement. On the other hand, if the carriage attains a position in advance of the stylus sufficient to displace the stylus from its null position, circuit 63 generates a backward correction control signal at connectin 67 which is applied to a reverse control input terminal of motor drive circuit 65 to induce a backward movement of the carriage.

Motor drive circuit 65 generates the requisite signal waveshapes for energizing the particular stepper motor utilized.

The circuitry shown circumscribed by the broken line 70 is for illustrative purposes only. It should be appreciated that storage circuitry 61 may be eliminated and consecutive sets for eight samples counted directly as the samples are taken. Further, the circuitry 70 may be subsumed within a microprocessor. In this instance sampling is performed by (a) insuring that the output signal of comparator 59 conforms to normal logic levels and (b) gating the microprocessor input to receive the bilevel signal at the appropriate intervals. The invention resides in the concept of converting the instantaneous position signal to a bilevel signal, the duty cycle of which is referenced to the stylus null position and producing control signals related to the duty cycle of the bilevel signal on a per disc revolution basis and not on the specific hardware employed.

What is claimed is:

1. A disc record player for recovering recorded signal from a rotatable disc record by means of a track following stylus housed in a carriage for translating said stylus radially across the disc record, said carriage being translated by a stepper motor coupled thereto, said player including stepper motor drive circuitry comprising:

sensor means for generating a continuous signal having a period equal to the reciprocal of the rotation rate of said disc and proportional to a relative stylus-carriage position in a direction radial to the disc record;

first means for reducing said position signal to a bilevel signal, having first and second amplitudes depending on the position signal being greater or lesser than a substantially constant reference signal respectively; and second means responsive to said bilevel signal for determining the relative duration of the first to second level amplitudes for substantially 360 degrees of signal track and generating respective stepper motor control signals for the duration of the first level amplitude being a prescribed amount greater or lesser than the duration of the second level amplitude.

2. The disc record player set forth in claim 1 wherein the first means comprises a comparator circuit.

3. The disc record player set forth in claim 1 wherein the first means is a threshold detector having an input terminal or applying the position signal and an output terminal.

4. The disc rcord player set forth in claim 1 further including:

third means responsive to the recovered signal for generating system controls for sequencing said second means; and fourth means for generating successive stepper motor control signals occuring regularly in synchronism with disc record rotation to produce a substantially contant time averaage translation of said carriage.

5. The disc record player set forth in claim 4 wherein said fourth means is subsumed in said third means.

6. The disc record player set forth in claim 1 or 4 wherein said second means is a microprocessor.

7. The disc record player set forth in claim 1 or 4 wherein the second means comprises:

sampling means for sampling the bilevel signal at a plurality of regular intervals for 360 degrees of signal track;

counting means for counting the number of samples per 360 degree of signal track which have a first level amplitude;

control pulse generating means responsive to said number of first level amplitude samples for generating forward and reverse stepper motor control signals respectively for said number being greater and lesser than prescribed limits.

8. A stylus/carriage servo system for a disc record player comprising:

a stylus-carriage position sensor for generating a continuous signal of fixed period and proportional to a relative stylus-carriage position;

a threshold detector responsive to said position signal for generating a bilevel signal producing a first level output signal whenever said position signal exceeds a predetermined substantially constant threshold and producing a second level output signal otherwise;

sampling circuitry for sampling the bilevel signal at regular intervals per revolution of said disc record;

a counter for counting the number of samples having one of said first and second levels in prescribed sets of successive samples;

control pulse generating means responsive to the numbers counted by said counter for generating forward servo motor control signals for said numbers in a first range and backward sevo motor control pulses for said numbers in a second range.

9. The servo system set forth in claim 8 further including a stepper motor coupled to said carriage and responsive to the forward and backward servo motor control signals for translating the carriage and thereby the stylus radially across the disc record.

10. In a disc record player of the type having a track following stylus compliantly coupled in a carriage assembly, said carriage assembly including a servo motor for traversing the carriage and thereby the stylus radially across the disc, the method of generating servo motor control signals comprising:

sensing the stylus position within said carriage relative to a centered position and generating a continuous signal proportional to the stylus position;

comparing the position signal to a fixed reference to convert the position signal to a bilevel signal having first and second amplitude levels corresponding to the stylus being ahead or behind the centered position;

sampling the bilevel signal a fixed number of times per disc revolution;

counting the number of samples per disc revolution having said first amplitude level;

producing one of several predetermined servo motor control signals, each of said predetermined control signals corresponding to a particular number of first level amplitude samples counted.

* * * * *

UNITED STATES PATENT AND TRADEMARK OFFICE
CERTIFICATE OF CORRECTION

PATENT NO. : 4,406,002

DATED : Sep. 20, 1983

INVENTOR(S) : Charles M. Wine

It is certified that error appears in the above-identified patent and that said Letters Patent is hereby corrected as shown below:

| | |
|---|---|
| Column 3, line 40 | "application Ser. No. 116,249" should be --U.S. Pat. No. 4,327,434--. |
| Column 3, line 42 | "inventor" should be --invention--. |
| Column 6, line 15 | "guantized" should be --quantized--. |
| Column 6, line 62 | "positioncorrection" should be --position correction--. |
| Column 7, line 39 | "connectin" should be --connection--. |
| Column 7, line 48 | "for" should be --of--. |
| Column 8, line 33 | "averaage" should be --average--. |

Signed and Sealed this

Twentieth Day of March 1984

[SEAL]

Attest:

GERALD J. MOSSINGHOFF

Attesting Officer     Commissioner of Patents and Trademarks